UNITED STATES PATENT OFFICE.

CHARLES R. BOGGS, OF ARLINGTON HEIGHTS, MASSACHUSETTS, ASSIGNOR TO SIMPLEX WIRE AND CABLE COMPANY, A CORPORATION OF MASSACHUSETTS.

VULCANIZED RUBBER.

1,364,055.   Specification of Letters Patent.   Patented Dec. 28, 1920.

No Drawing.   Application filed September 11, 1917. Serial No. 190,732.

*To all whom it may concern:*

Be it known that I, CHARLES R. BOGGS, a citizen of the United States, and resident of Arlington Heights, in the county of Middlesex and State of Massachusetts, have invented Improvements in Vulcanized Rubber, of which the following description is a specification.

My present invention is an improved vulcanized rubber, as an article of manufacture, the present application being a continuation in part of my prior application, Ser. No. 824,951, filed March 16, 1914, now Patent No. 1,249,272, dated December 4, 1917. As explained in said patent, wherein my novel process of vulcanizing with selenium or its compounds, is described and claimed, I have discovered that an improved vulcanized rubber product is obtained by the employment of selenium or any of the selenium compounds, as a vulcanizing agent, preferably utilizing an artificial accelerator, as explained in said prior application. In manufacturing my improved product, rubber, reclaimed or regenerated rubber, or wild caoutchouc, as well as synthetic rubber, may be used, and I prefer to employ selenium, or its compounds, in the form of a powder, mixing the same with the rubber and with an accelerator. Heretofore it has been customary to depend on sulfur or its compounds as an essential element in vulcanization, and therefore my discovery of a practical method of vulcanization with selenium or its compounds results in a new article of manufacture. In carrying out my invention I may use any of the selenium compounds, such for example as its chlorids, selenids, poly-selenids, or the like, with good results. Also a mixture of any of these forms of selenium may be employed with sulfur compounds in carrying out my invention. My invention is equally capable of use in the production of either hard or soft vulcanized rubber, this being controlled entirely according to the amount of selenium used and the time and temperature employed, procuring a greatly improved quality of product, the physical tests and the enduring qualities of the resulting rubber article being all materially increased.

While I may employ selenium or its compounds to vulcanize rubber, without the addition of an artificial accelerator, I prefer to utilize some accelerator, preferably such as is explained in my said patent, such accelerator consisting of the primary or secondary amins of the aliphatic or aromatic series or other ring structure.

In practice, I find that the following formulæ have proved to be especially practicable and commercially satisfactory, and are herein given for the purpose of illustration, it being understood that a wide variation from these examples is within the scope of my invention. For example, one hundred parts Hevea rubber, fourteen parts selenium, one part para - nitroso - di - methyl - anilin, twenty-five parts litharge, and one hundred seventy-five parts of whiting and zinc oxid. This mixture, when heated at 275 degrees F. for an hour, gives a very satisfactory improved vulcanized rubber product, especially successful in making a soft vulcanized product.

Another example is the following: One hundred parts of Hevea rubber are mixed with twenty-eight parts of selenium, four parts beta-naphthylamin, twenty-five parts litharge, four parts paraffin, and one hundred and thirty parts of zinc oxid and whiting in suitable proportions, and heated at 320 degrees F. for four hours. The time can be materially reduced with increase in temperature, and any filler may be employed; for example, I find that a suitable proportion for the whiting and zinc oxid is 80 parts of whiting to 50 parts of zinc oxid, constituting a total of 130 parts, but as both these materials are inert agents, these proportions may be, of course, widely varied.

As above explained, the variation in the amount of selenium used and the time and temperature of the heat applied for vulcanization will control the production of either hard or soft vulcanized rubber, as will be readily understood by those skilled in the art.

The resulting product is a new article of manufacture, and being a direct production of my selenium process, I wish to claim the same herein.

My invention is further described and defined in the form of claims as follows:

1. As a new article of manufacture, vulcanized rubber consisting, before vulcanization, of a mixture of rubber, inert matter, selenium, and an accelerator of the amins of the aromatic series.

2. As a new article of manufacture, vulcanized rubber consisting before vulcanization, of one hundred parts of rubber mixed with twenty-eight parts of selenium, four parts beta-naphthylamin, twenty-five parts litharge, four parts paraffin, and one hundred and thirty parts of zinc oxid and whiting.

In testimony whereof, I have signed my name to this specification, in the presence of two subscribing witnesses.

CHARLES R. BOGGS.

Witnesses:
AGNES B. GRIFFIN,
SEBASTIAN RUGGERI.